Sept. 20, 1927.
A. J. BRIGGS
1,643,110
ATTACHMENT FOR WIRE ROPE AND PROCESS OF PRODUCING THE SAME
Filed Aug. 11, 1924   2 Sheets-Sheet 1
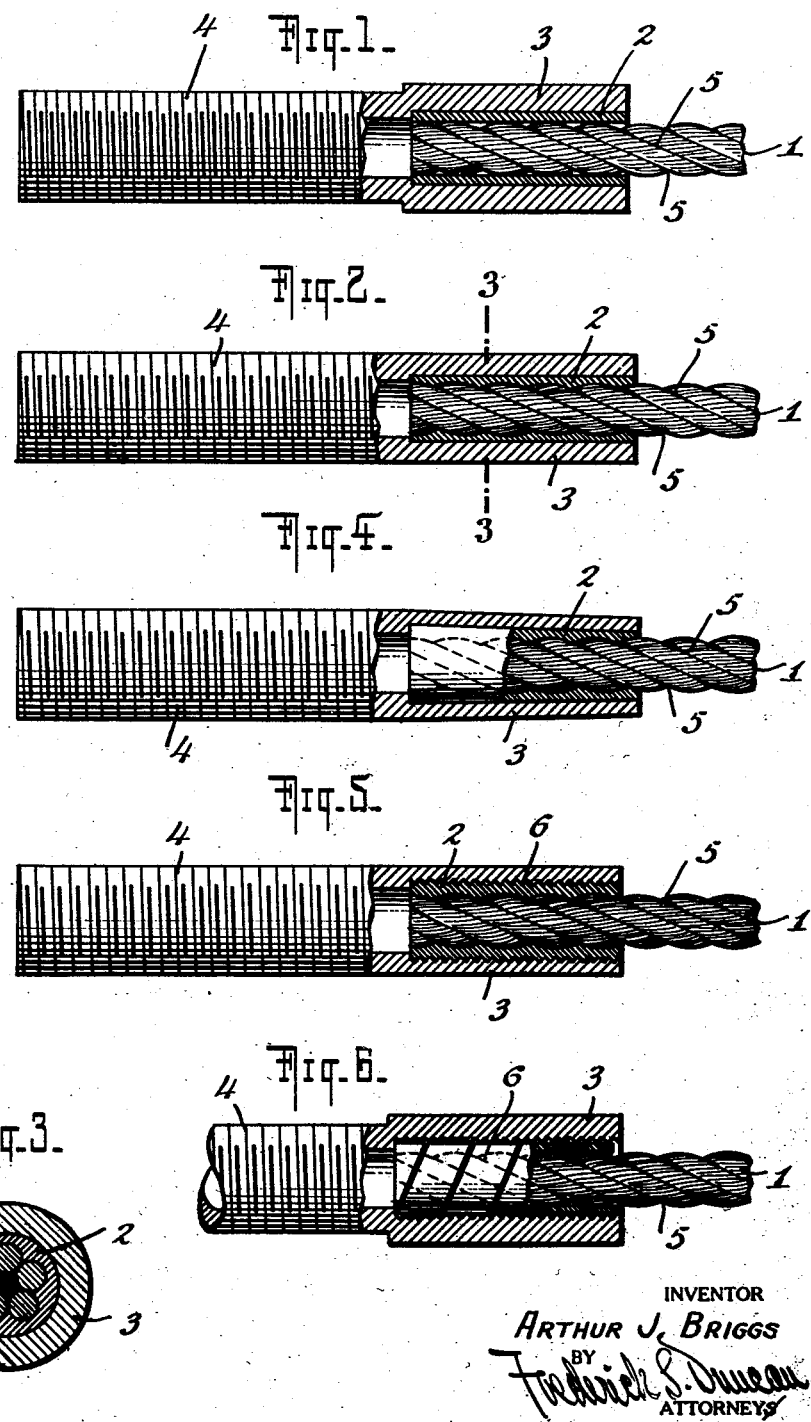
INVENTOR
ARTHUR J. BRIGGS
BY
ATTORNEYS

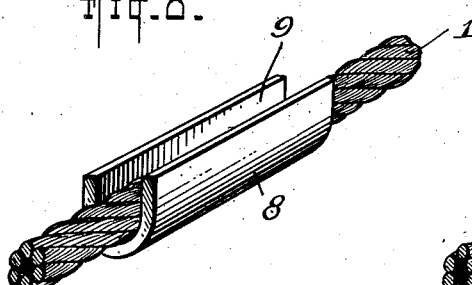
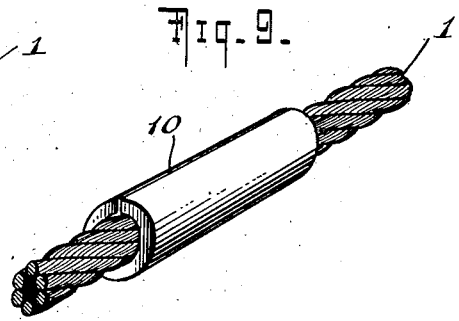
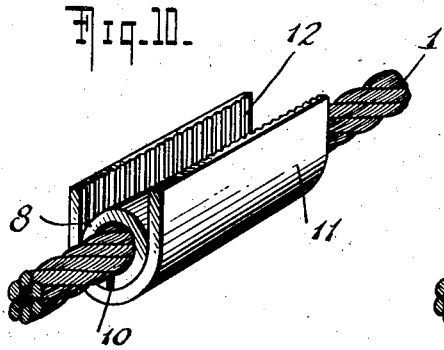
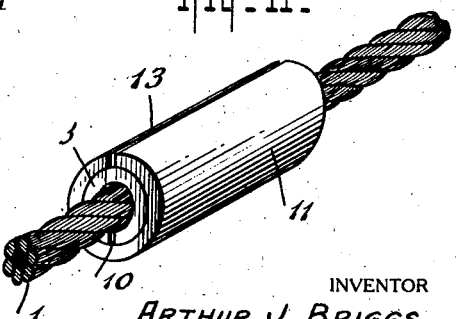
INVENTOR
ARTHUR J. BRIGGS
BY
ATTORNEYS Patented Sept. 20, 1927.

1,643,110

UNITED STATES PATENT OFFICE.

ARTHUR J. BRIGGS, OF SYRACUSE, NEW YORK, ASSIGNOR, BY MESNE ASSIGNMENTS, TO AMERICAN CABLE COMPANY, INC., OF NEW YORK, N. Y., A CORPORATION OF DELAWARE.

ATTACHMENT FOR WIRE ROPE AND PROCESS FOR PRODUCING THE SAME.

Application filed August 11, 1924. Serial No. 731,325.

My invention relates to means for anchoring to wire rope, attachments of various kinds, such as threaded shanks, eyes, hooks, yokes, clevises and other elements commonly employed as connecting means for rope.

A method commonly employed of securing attachments to wire rope consists in the utilization of "thimbles" so-called. The rope is looped about the thimble and secured by serving or clamping, which is not only a somewhat laborious operation requiring considerable skill, but an operation which seldom results in a union that possesses a degree of strength equal to that of the cable proper. Furthermore, this method is readily adaptable for securing attachments to the ends only of the rope. Various forms of attachments of the general nature hereinbefore referred to may be connected to the rope by means of these thimbles.

Another conventional method of securing anchoring means to the ends of wire rope is that known as "socketing" and consists in passing the end of the rope through a socket, then splaying or spreading the end, and then filling the interstices of the splayed end with zinc or other suitable soldering substance. In that way an enlargement is made at the end of the cable which prevents it from being pulled through the socket which is anchored to it. This method requires, in the first place, the use of heat and a little more than the average skill found among workmen. Furthermore, any sort of soldering material which can be used at low temperatures is necessarily soft, and due to the nature of the strains and wear which are imposed upon it, rapidly gives way in ordinary service. Furthermore, the method is not readily adaptable to the anchoring of stops or other securing attachments at points on the rope intermediate its ends. Whenever it is desired to anchor stops or other attachments at points intermediate the ends of the rope, it is usually customary to use clamps of one kind or another which are retained by bolts, rivets or similar means. For this purpose, open U-shaped pieces are frequently employed which, after being put in place on the rope, are merely closed about it with pliers or other suitable tools, and then sometimes soldered or brazed for greater security. The soldering or brazing, however, is particularly objectionable where such rope is to be used for running over sheaves, for the reason that unless extreme care is taken in the soldering or brazing operation, the soldering or brazing material runs along the cable for a considerable distance on one side or the other or both sides of the attachment, thus making a portion of the rope stiff and unyielding to the curvature of the sheave. Under such conditions the portion of the rope which is filled with solder or brazing material speedily disintegrates. In addition, the use of soldering material, particularly zinc, frequently requires acid fluxes, which, as is well known, are extremely corrosive and consequently objectionable.

Another method for carrying out the same object has come into recent use and consists in loosely fitting a sleeve to the rope, closing it in until the material of the sleeve penetrates or flows into the "threads" or grooves of the rope. An entirely effective and serviceable anchorage of this character can be readily made; but on account of the fact that in practice it requires the use of a swaging machine capable of imparting a series of rapidly recurring blows, and for the reason that the degree of swaging is somewhat critical, it is subject to some objections when it is attempted to make use of it in field work and with the services of ordinary unskilled labor.

The general object of my invention is then to overcome the objections present in the methods above described.

More specifically, the objects of my invention are to provide an anchorage for a wire rope attachment and methods of producing it which are especially adaptable for field work and within the abilities of ordinary unskilled labor.

Another object of my invention is to provide a method of applying an attachment to cables of such a nature that it may be carried out with the work cold and yet result in a union as strong as, or stronger than, the rope proper.

Another object is to provide a method of applying an attachment to wire rope with the work cold and involving the use of compressive force in such manner that the individual wires of the rope are not ruptured and the rope as a whole is not injured.

Another object of my invention is to provide a method of applying attachments to cables by the use of pressure if desired as distinguished from processes involving a rapidly recurring series of blows, the object being to more readily devise a method suitable for field work where swaging machines are unhandy or for other reasons not desirable or available.

Describing the drawings:

Fig. 1 is a view partly in longitudinal section illustrating one form of carrying out the process.

Fig. 2 is a view partly in longitudinal section of the final product of the process shown by Fig. 1.

Fig. 3 is a transverse section on the line 3—3 of Fig. 2.

Fig. 4 is a view partly in longitudinal section of a modified form of the completed product.

Fig. 5 is a view partly in longitudinal section of another form of the completed product.

Figs. 6 and 7 are similar views of other modifications.

Figs. 8, 9, 10, and 11 are views showing further adaptations of the invention.

Referring to the drawings:

The numeral 1 indicates the end of a length of wire rope of a conventional type. On the rope 1 there is slipped or otherwise applied a filler consisting of a loosely fitting sleeve 2 of copper, aluminum, wrought iron, lead, or other metal characterized by malleability and relative softness as compared with the material of the rope 1 and the material of the outer sleeve 3. Over the soft metal sleeve 2 there is slipped an outer sleeve 3 of steel or other metal capable of resisting the stresses which would be met under service conditions to which the particular work is to be subjected. This outer sleeve may be provided with any suitable attaching element, such for example as the threaded shank 4 which, for purposes of attachment, may be screwed into a threaded aperture or be provided with a nut or otherwise adapted for being secured to a desired point of connection.

The next step in the process consists in applying with the work cold suitable compressive force, either pressure or repeated blows, to the exterior of the outer sleeve 3 until the outer sleeve 3 has become deformed and the material of the inner sleeve 2 has been compacted in the space between the outer sleeve and the rope and forced to flow into the grooves or threads 5 of the rope and to be firmly gripped by the outer sleeve 3. The result of this step is shown in Figs. 2 and 3.

In case the interior surface of the outer sleeve is provided with no special means for securing a grip on the soft metal sleeve, except by way of frictional engagement, it is preferable, if good results are to be obtained, that the compressive force be so exerted and distributed that the outer sleeve and the inner sleeve will assume the configuration shown in Figure 4; that is to say, the outer sleeve and consequently the inner sleeve are compressed to a tapering form so that a positive resistance is opposed to the stripping of the outer from the inner sleeve.

Another method of insuring a strong union between the outer sleeve and the inner sleeve is illustrated by Fig. 5, which shows a modified form of the completed product. The interior of the outer sleeve initially and throughout the process presents an irregular surface, for example, in the form of serrations such as are produced by ordinary threading, the inner sleeve before compression being substantially of the form shown in Fig. 1. When the swaging or pressure takes place, the material of the inner sleeve flows not only into the grooves or "threads" of the rope, but also into the serrations 6 of the outer sleeve, and thus the outer sleeve firmly and positively grips the inner sleeve.

Another convenient adaptation of the invention is shown in Fig. 6 and consists in winding about the rope in helical form a strip 6 of relatively soft metal, then applying the outer sleeve and then swaging or compressing the whole, as in the case of the processes described in connection with the previous figures. This is a method of convenience suitable for situations in which closed sleeves are not available, or the use of which for some reason or other offers difficulties. An instance of the difficulties referred to frequently exists when it is attempted to apply the attachment to ordinary twisted rope, such for instance as rope of the type made in the so-called "snake" machine. This rope, as is well known, spreads apart when cut unless it be served or clamped in some manner or other before cutting. It is obvious that in affixing the attachment to the end of rope of this character, the rope may first be served with the soft metal strip as shown in Fig. 6. It may then be cut at the proper point and the helically wound strip will prevent it from spreading. The outer sleeve may then be slipped over the inner sleeve without difficulty. On the other hand, when rope of the so-called "inert lay"

type is used, it may be cut at any desired point and there will be no tendency for it to spread or spring out. By the term "inert lay", I refer to rope of the type made according to the process in which the several strands are preformed into helices before laying. Obviously, rope of this type offers no difficulties in the practice of the processes illustrated by Figs. 1 to 5 inclusive.

It is often desired to anchor an attachment frequently in the form of a plain stop at some point intermediate the ends of the cable. For this purpose my process is readily adapted and the resulting product is shown in Fig. 7 in which the outer sleeve 7 together with the inner sleeve 8 serves as a stop for preventing the cable from being drawn through apertures, yokes and the like.

Frequently, however, it is not feasible to slip either of the sleeves over the end of the cable, and in such case the process illustrated by Figs. 8, 9, 10, and 11 may be employed. According to this process, a trip of soft metal 9 may be merely wrapped around the cable so that its edges approach or meet each other as indicated by 10 in Fig. 9. This serves as the inner sleeve or filler. Similarly the outer sleeve 11 preferably having the serrated surface 12 may be wrapped about the filler until its edges approach each other or meet as indicated by 13 in Fig. 11. The compressive force in the form of swaging or pressure may be then applied and the whole suitably deformed so that the material of the filler is compacted and flows into the grooves of the cable as well as into the serrations of the outer sleeve. Of course it is not to be supposed that the process of Figs. 8, 9, 10, and 11 will result in as strong or effective a union as in the case of the processes in which complete closed cylindrical sleeves are used.

I have described a few simple and practical embodiments of my invention. It is to be understood, however, that modifications, changes, and adaptations may be made which will nevertheless be within the scope of the appended claims which are as follows:

1. The method of anchoring attachments to stranded wire structures which consists in applying to the stranded wire structure, a sleeve of relatively soft and malleable metal, enclosing the soft sleeve in another sleeve of harder metal and applying compressive force to the outer sleeve while said soft sleeve is still uncompressed and continuing said compression of said outer sleeve until the material of the inner sleeve flows and compacts into the grooves or threads of the stranded wire structure.

2. The method of securing attachments to stranded wire structures which consists in loosely applying to the stranded wire structure a filler of relatively soft and malleable metal, applying to the soft filler a surrounding sleeve of harder metal, and applying compressive force to the outer sleeve until the material of the loose inner sleeve flows and compacts into the grooves of the stranded wire structure and until the outer sleeve grips the inner closely.

3. The method of securing attachments to stranded wire structures which consists in applying to the stranded wire structure a sleeve of relatively soft and malleable metal, enclosing the soft sleeve in another sleeve of harder metal having an irregular interior surface and applying compressive force to the outer sleeve until the material of the inner sleeve compacts in the space between the outer sleeve and the stranded wire structure and flows into the grooves or threads of the stranded wire structure and is gripped by the irregular interior surface of the outer sleeve.

4. The method of securing attachments to stranded wire structures which consists in applying to the stranded wire structure an inner split sleeve of relatively soft and malleable metal and an outer sleeve of relatively hard metal and applying compressive force to the outer sleeve until the material of the inner sleeve is compacted and flows into the grooves or threads of the stranded wire structure, said outer sleeve serving to resist the stresses met in service conditions and to confine the inner sleeve and reinforce its resistance to displacement relatively to the stranded wire structure.

5. A wire rope attachment comprising an inner sleeve of relatively soft and malleable material and an outer sleeve therefor of relatively hard metal, the material of the inner sleeve being compacted in the space between the outer sleeve and the rope including the grooves or threads of the rope, said outer sleeve serving to resist the stresses met in service conditions and to confine the inner sleeve and reinforce its resistance to displacement relatively to the stranded wire structure.

6. A wire rope attachment comprising a connecting element provided with a sleeve surrounding the rope and retained thereon by a filler of relatively soft and malleable metal compacted in the space between the sleeve and the rope.

7. A wire rope attachment comprising a sleeve surrounding the rope and retained thereon by a filler of relatively soft and malleable metal, the inner surface of the sleeve being provided with serrations, and said filler filling the grooves or threads of the rope, and being gripped by the said serrations.

8. A wire rope attachment comprising a sleeve surrounding the rope and having an irregular interior surface, and a filler compacted in the space between the sleeve and the rope and filling the grooves and threads of the latter.

9. A wire rope attachment comprising a sleeve surrounding the rope and having an interior serrated surface, and a filler compacted in the space between the sleeve and the rope and filling the grooves of the rope and gripped by the serrated surface.

In witness whereof, I have signed this specification.

ARTHUR J. BRIGGS.